United States Patent [19]

Rajecki et al.

[11] Patent Number: 5,420,376
[45] Date of Patent: May 30, 1995

[54] PLASTIC ELECTRICAL BOX FOR INSTALLATION IN POURED CONCRETE

[75] Inventors: James A. Rajecki, Broadview Heights; Daniel J. Wanhainen, Newbury, both of Ohio

[73] Assignee: The Lamson & Sessions Co., Cleveland, Ohio

[21] Appl. No.: 102,721

[22] Filed: Aug. 6, 1993

[51] Int. Cl.$^6$ .................................................. H02G 3/12
[52] U.S. Cl. ........................................ 174/48; 52/220.1
[58] Field of Search .............................. 174/48, 49, 58; 52/220.1; 220/3.3, 3.4

[56] References Cited

U.S. PATENT DOCUMENTS

| | | | |
|---|---|---|---|
| 1,229,576 | 6/1917 | Boyton et al. | 220/3.2 |
| 1,689,248 | 10/1928 | Malcolm | 52/220.1 X |
| 1,771,225 | 7/1930 | Knight | 220/3.4 |
| 1,828,876 | 10/1931 | Rohn | 52/220.1 X |
| 1,837,626 | 12/1931 | McRae et al. | 220/3.4 |
| 1,934,300 | 11/1933 | Fullman | 220/3.92 |
| 2,038,291 | 4/1936 | Hooley | 220/3.4 |
| 2,038,292 | 4/1936 | Hooley | 220/352 |
| 2,620,081 | 12/1952 | Lear, Jr. | 220/3.8 |
| 2,775,017 | 12/1956 | McDonough | 52/220.1 X |
| 2,983,399 | 5/1961 | Slater et al. | 220/3.4 |
| 3,104,774 | 9/1963 | Hudson et al. | 220/3.94 |
| 3,343,704 | 9/1967 | Terry | 220/3.4 |
| 3,453,788 | 7/1969 | Marin | 52/99 |
| 4,244,484 | 1/1981 | Guritz et al. | 220/3.7 |
| 4,247,738 | 1/1981 | Bonato | 174/53 |
| 4,331,832 | 5/1982 | Curtis et al. | 174/57 |
| 4,742,585 | 5/1988 | Logsdon | 4/661 |

*Primary Examiner*—Leo P. Picard
*Assistant Examiner*—David Tone
*Attorney, Agent, or Firm*—Fay, Sharpe, Beall, Fagan, Minnich & McKee

[57] ABSTRACT

An electrical box assembly for installation in a poured concrete building partition, such as a ceiling, comprises a base ring member including a ring body having a central through opening and radially extending mounting tabs for permitting the base ring member to be joined to a form over which concrete is to be poured during forming of the building partition. The base ring member further includes an upper edge surrounding the through opening with connection portions lying radially outwardly of the upper edge. A box cover member is provided for connection to the base ring and terminates in a lower edge with a laterally extending shoulder receiving the upper edge of the base ring member. The box cover member further includes releasable connectors joined with the connecting portions on the base ring member for maintaining the box cover member in engagement with the base ring member. Selectively removable knockout portions are provided in the cover member for allowing connecting of the conduit therewith.

17 Claims, 5 Drawing Sheets

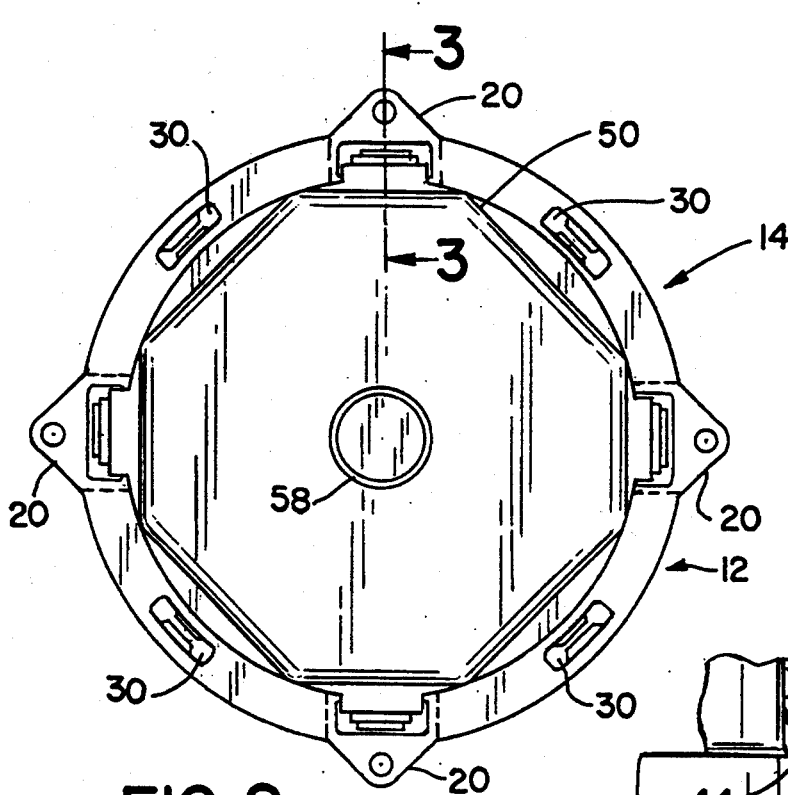
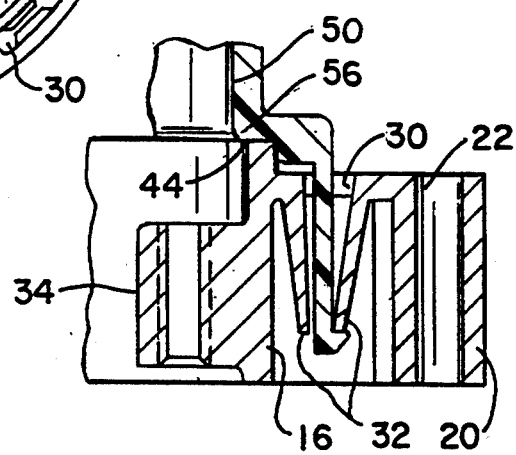
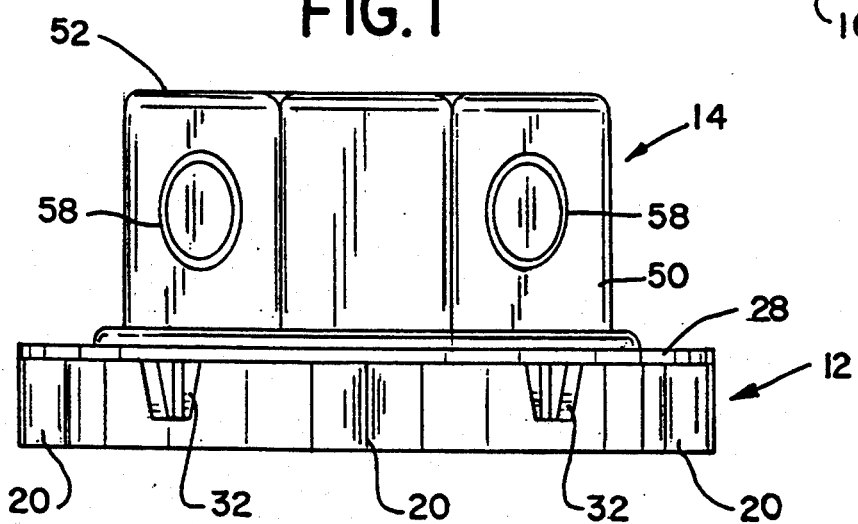

PLASTIC ELECTRICAL BOX FOR INSTALLATION IN POURED CONCRETE

BACKGROUND OF THE INVENTION

The subject invention is directed toward the art of electrical boxes and, more particularly, to a box assembly especially suited for installation in poured concrete building partitions such as walls and ceilings.

During building construction of the steel and poured concrete type, it is preferred that the electrical boxes and the associated conduits and electrical wireways be cast directly in the concrete. Typically, this has been accomplished by nailing open faced, metal electrical boxes directly to the forms over which the concrete is poured. The conduits necessary for routing the electrical wires and cables to the boxes are connected in position between the proper boxes. Thereafter, the concrete is poured. After the concrete sets up and the forms are removed, access is then available to the interior of the cast in place boxes through their exposed open faces.

This system has been in widespread use for many years. It does, however, have certain disadvantages and drawbacks. For example, the steel boxes and conduits rust over time since the concrete tends to hold or absorb ambient moisture. Also, the installation of the conduit after the boxes are nailed to the forms is relatively difficult and sometimes requires working in difficult and cramped situations. Further, if an attempt is made to assemble the outlet boxes and conduits in sections which are then installed in place on the forms, the weight and rigidity of the assembly makes for installation difficulties.

SUMMARY OF THE INVENTION

The subject invention overcomes the above problems and provides an electrical box assembly which is particularly suited for installation in a poured concrete building partition by being put in place on the partition form prior to the time that the concrete is poured in place. The assembly of the invention generally comprises a base ring member formed of plastics material and including a continuous ring body having a central through opening of sufficient size to allow the required electrical components to be mounted therein. Radially extending mounting tabs are carried on the base ring to permit it to be directly connected to the form over which the concrete is to be poured during forming of the building partition. The base ring member further preferably includes a circumferentially continuous, upper sealing edge which surrounds the through opening. Also, connection portions are carried on the ring at a position lying radially outwardly of the upper edge. Mounted over the base ring member and joined thereto by releasable connecting means which engage with the connecting portions of the base ring is a box cover member which is also formed of plastics material and has a circumferentially continuous side wall, a closed top wall, and an open bottom. The side wall terminates in a lower edge with a laterally extending shoulder that receives the upper edge of the base ring member. Preferably, selectively removable knockout portions are provided in the side wall of the box cover member for allowing connection of electrical conduits therewith.

The selective connectable relationship between the base ring member and the box cover member greatly facilitates use and installation of the assembly. In use, the base ring member can be positioned at the desired final location on the partition forms and fastened in place, such as by nailing or the like. The individual box cover members can, prior to installation on their respective base rings, be connected with flexible non-metallic conduit and the associated cover box members that the system will include. Thereafter, the cover box members can be snapped in position on the associated base ring member.

In accordance with a further aspect of the invention, the connecting means on the box cover preferably comprise resilient legs which extend downwardly and have latch portions which engage with the connecting portions of the base ring member. The connecting portions of the base ring members are preferably openings which receive the resilient legs.

Preferably, there are a plurality of the connecting openings located at spaced positions about the base ring so that the base ring and box cover member can be joined in any of a plurality of different angular orientations.

In a further, somewhat limited aspect of the invention, the base ring member is preferably formed from a relatively strong, fiber filled or fiber-reinforced plastics material. The use of all plastic in the assembly eliminates the problems with rust and corrosion which were previously present in the steel systems. Additionally, the installation of electrical systems using the subject assembly are greatly facilitated.

As can be seen, a primary object of the invention is the provision of an outlet box assembly which simplifies placement and layout of electrical systems in poured concrete structures.

Yet another object is the provision of a box assembly of the type described wherein the components are formed of plastics materials and releasably snapped together to form the finished box assembly.

A still further object is the provision of a system of the type described wherein the conduit runs between associated box assemblies can be completed prior to the actual Joining of the conduit runs to the forms for the concrete pouring operation.

BRIEF DESCRIPTION OF THE DRAWINGS

The above and other objects and advantages will become apparent from the following description when read in conjunction with the accompanying drawings wherein:

FIG. 1 is a side elevational view of an outlet box assembly which is formed in accordance with a preferred embodiment of the invention;

FIG. 2 is a top plan view of the box assembly shown in FIG. 1;

FIG. 3 is a cross-sectional view taken on line 3—3 of FIG. 2 and showing the interconnecting arrangement between the base ring member and the box cover member;

DETAILED DESCRIPTION OF THE PREFERRED AND ALTERNATE EMBODIMENTS

Referring more particularly to the drawings wherein the showings are for the purpose of illustrating the preferred embodiments of the invention only, and not for the purpose of limiting same, FIG. 1 shows the overall arrangement of an electrical box assembly formed in accordance with the subject invention and including a base ring member 12 and an associated box cover member 14 which is releasably joined thereto to define a suitable box or chamber structure for mounting and supporting electrical components, such as lighting fixtures, in building partitions and, especially, poured concrete ceilings.

Figure 4:
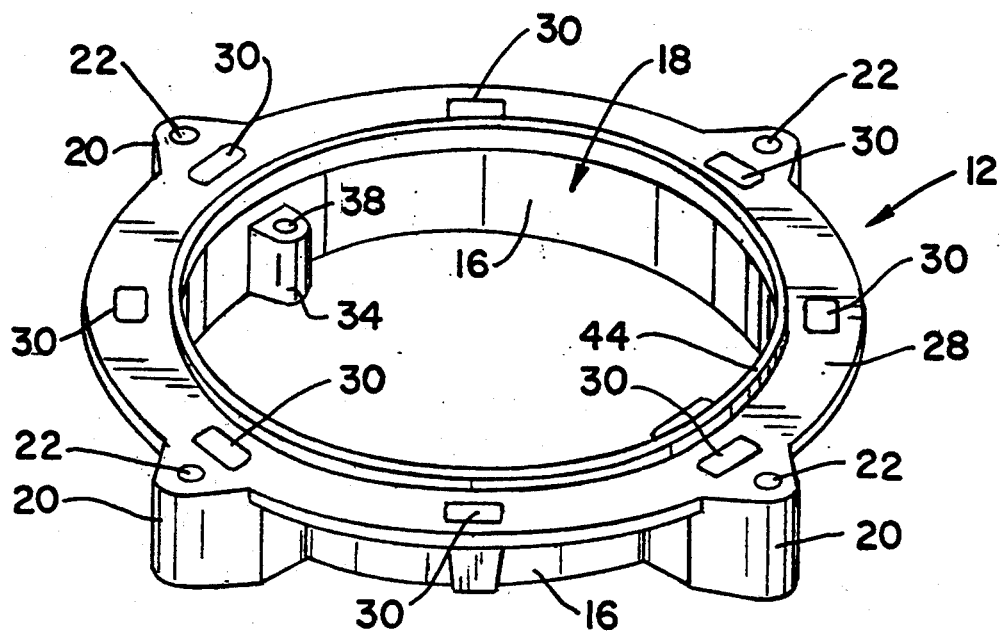
FIG. 4 is a top isometric view of the base ring member.
Figure 5:
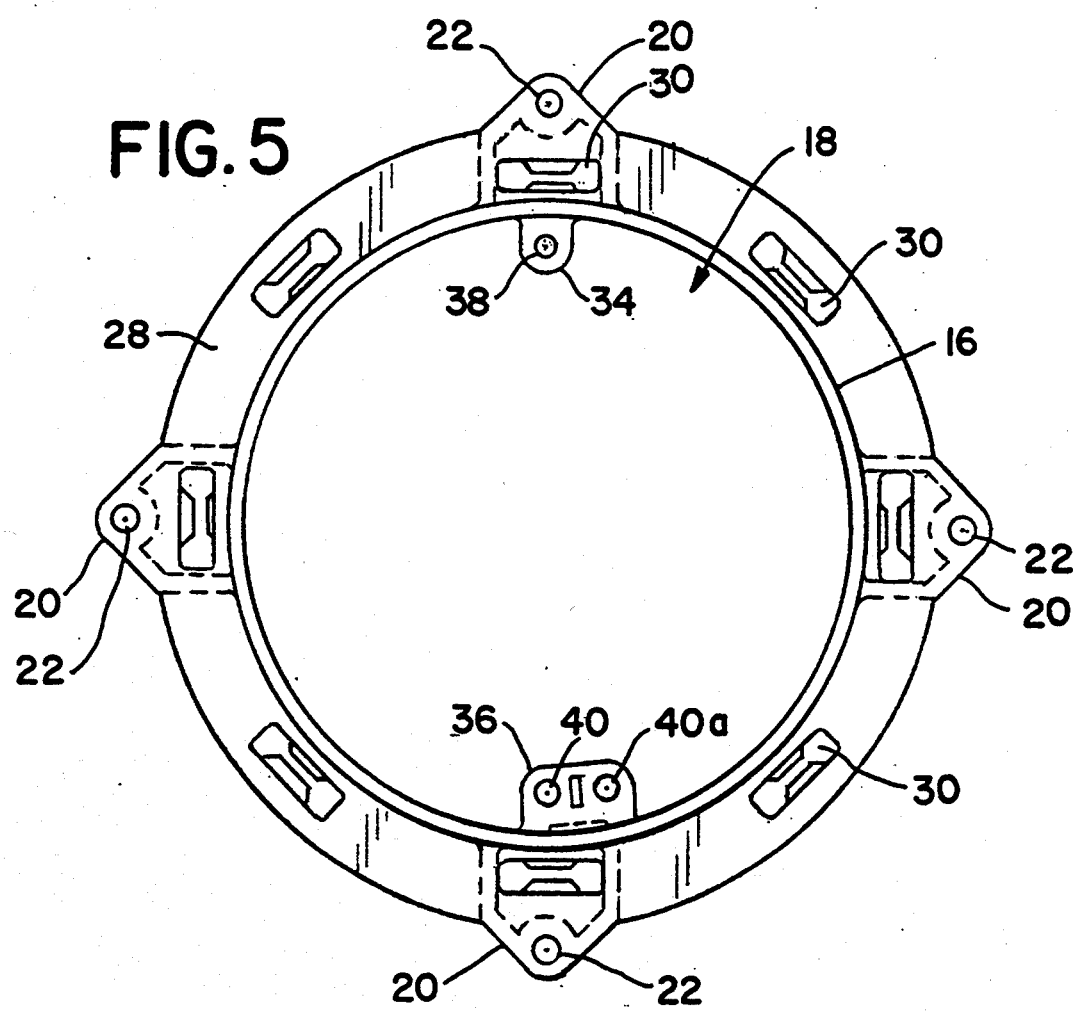
FIG. 5 is a top plan view of the base ring member.
Figure 6:
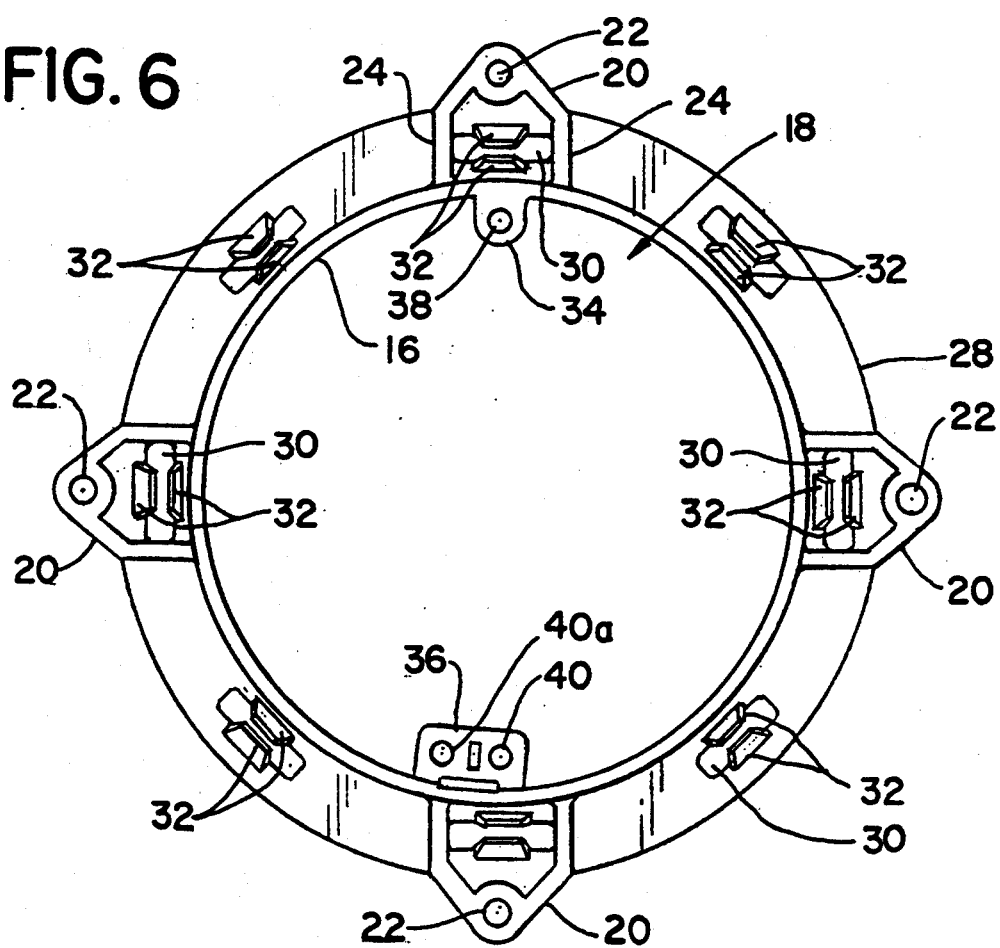
FIG. 6 is a bottom plan view of the base ring member.
Figure 9:
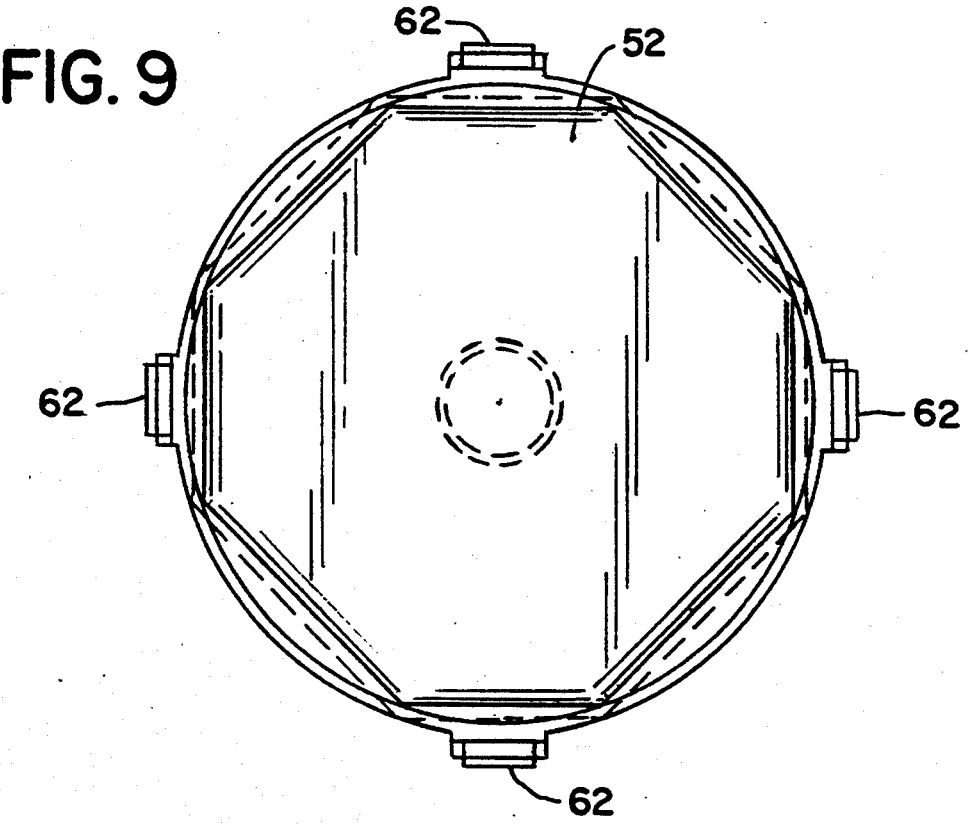
FIG. 9 is a bottom plan view of the box cover member shown in FIG. 7.
Figure 8:
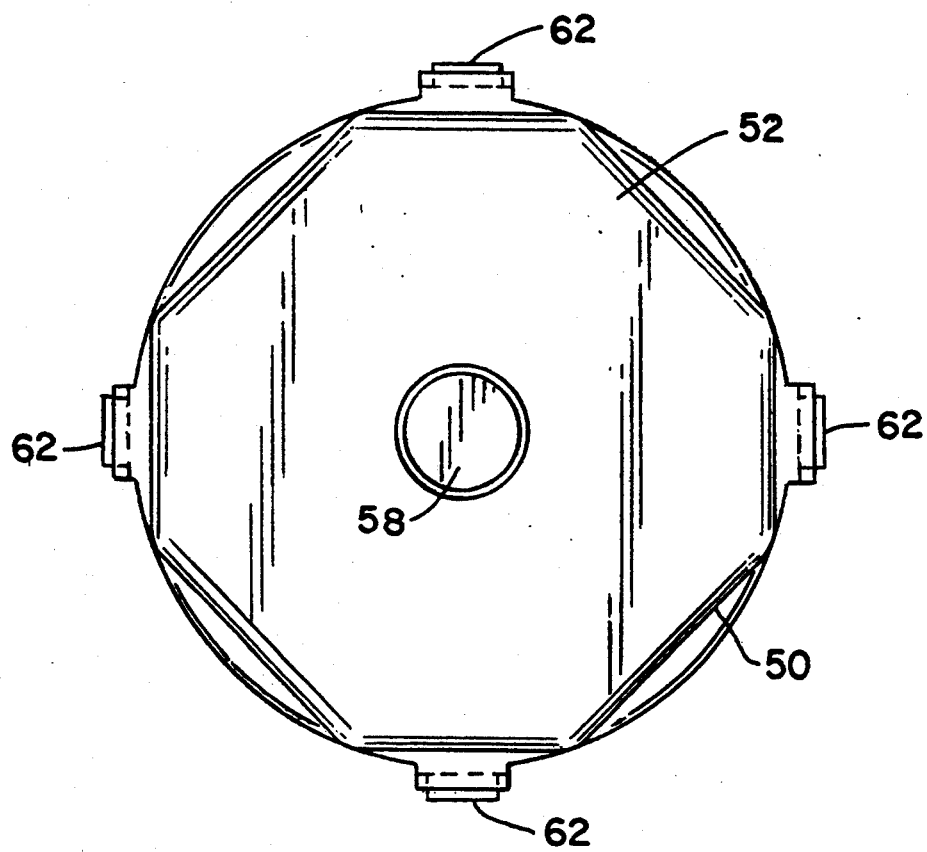
FIG. 8 is a top plan view of the box cover member shown in FIG. 7.

The base ring is formed from a plastics material which is preferably a relatively strong, impact-resistant material. Also, it is highly desirable that the material have good chemical and temperature resistance. A suitable material which has been used for this purpose is a 30% glass filled PBT. The base ring member is arranged to be joined to the partition form boards prior to the time that the concrete is poured in place. The ring 12 includes, as best seen in FIGS. 4 through 6, a main ring body 16 that is sufficiently large so as to enclose a central through opening 18 capable of housing or surrounding the electrical component structures with which the box is intended to be used. The box of the subject embodiment is typically intended for supporting standard components, such as lighting fixtures. The shape of the ring body 16 is, in the subject embodiment, shown as circular. It could, however, have any of a variety of shapes and sizes. For intended purposes, however, it is preferred that the ring body be circumferentially continuous and fluid tight with no transverse through openings or the like.

The base ring member is arranged to be connected to the associated building or partition form boards by outwardly extending mounting portions 20 which are provided with vertically extending through openings 22. The openings 22 allow suitable nails, screws, or other fasteners to be extended therethrough for connection of the base ring 12 to the form elements. The outwardly extending portions 20 are somewhat in the nature of tabs but, as best seen in FIGS. 3, 5, and 6, comprise a portion which is integrally molded to the ring body 16 and is defined generally by a pair of spaced side walls 24 which join at a thickened outer end and form the opening 22.

Referring again to FIG. 4, it will be noted that base ring member 12 further includes a circumferentially continuous, radially extending flange which is located only a short distance below the upper edge of the continuous ring body 16. The flange acts to reinforce and rigidify the base ring member. Additionally, carried by the flange 28 are a plurality of openings which are circumferentially spaced about the flange 28 and constitute a portion of the connecting means which allow the box cover member 14 to be releasably connected with the base ring member 12. Although this connecting arrangement will subsequently be described in detail, for the present, it should be seen in FIGS. 3, 5, and 6 that each of the openings 30 is associated with a pair of tapered and downwardly extending, resilient elements 32. These elements function as a guide and connecting elements for joining the box cover member 14 to the base ring member Formed about the interior of the main ring body 16 are tab portions which provide means for permitting mounting of the previously-mentioned lighting fixtures or other components in the box assembly. As shown in FIGS. 4, 5, and 6, the subject embodiment includes two diametrically opposed tab portions 34 and 36. These tab portions provide suitable screw receiving openings 38 and 40, respectively. The openings 38 and 40 are sized and positioned so as to allow the electrical components to be connected in position across the base ring with their bodies extending up into the box cover member 14. In the subject embodiment, the tab 36 includes an additional connecting opening 40a so as to allow ground clips and the like to be connected with the assembly. It should be appreciated, however, that any of a variety of types and arrangements of mounting tabs could be carried within the body ring to allow a variety of different types of electrical components and equipment to be mounted in the box structure.

Preferably, and for reasons which will subsequently be described, the upper edge of the ring body 16 terminates in a smooth sealing edge 44. The edge 44 lies slightly above the flange 28 and, in a manner subsequently to be described, mates with an additional seal surface in the box cover member when the two components are in their assembled position. Preferably, the seal between the two components is sufficient so as to prevent infiltration of uncured or wet concrete into the housing during the concrete pouring operation to which the box assembly is subjected during use.

Referring to FIGS. 1, 2, and 7 through 8, the box cover member and its relationship to the base ring member can best be understood. As shown therein, the box cover member 14 includes a circumferentially continuous side wall 50 which, in the subject embodiment, is of a hexagonal configuration. A closed top wall 52 joins with the side wall 50. The lower end of the side wall 50 is open.

Preferably, the box cover member 14 is molded as a unitary structure from a suitable plastic, such as PVC or the like. Alternatively, the cover could be formed from the same material as the base ring, if desired. While, as noted, the box has an octagonal configuration, it could have other suitable shapes as desired. Additionally, it should be understood that the actual height or depth of the box cover member could vary from that shown and would be dictated by the intended use for the box assembly.

In the subject embodiment, the lower peripheral edge of the side wall structure 50 terminates in a radially outwardly extending flange portion 54 which is sized so as to extend outwardly sufficient to overlie the upper edge 44 of the base ring member 12. Additionally, as can be seen from FIG. 7, the flange 54 defines an inwardly extending shoulder portion 56 that includes a downwardly facing seal surface to overlie and engage the seal surface 44 located on the upper end of the ring body 16. This engagement between the seal surface 44 and the flange portion 56 can be seen in FIG. 3. As noted earlier, the seal between these should be sufficient to prevent infiltration of liquid or uncured concrete. Preferably, and as is well known, the side wall 50 and the top 52 are provided with suitably located circular groove or weaker portions to provide knockouts 58 which can be removed to form openings to allow selective connection of conduit to the box structure.

Figure 7:
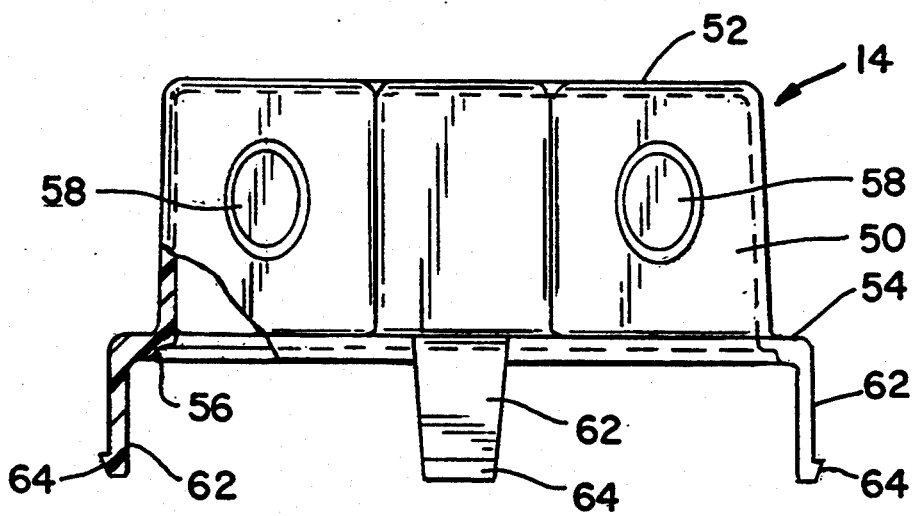
FIG. 7 is a side elevational view of the box cover member.

Selective and releasable connection of the box cover member 14 to the base ring member 12 is achieved through the use of resilient leg elements 62 that extend downwardly from the lower edge of side wall 50 as best shown in FIGS. 3 and 7. These resilient legs 62 are formed integrally with the flange portion 54 of the box cover element 14 and are sized and located such as to mate with the openings 30 of the base ring member 12. Note that in the subject embodiment there are shown four of the legs 62 located at 90° intervals circumferentially about the box cover element 14. Similarly, there are eight of the openings 30 and their associated tapered elements 32 carried on the flange 28 of the base ring member 12. The openings 30 are spaced at 45° intervals about the flange 28. Thus, as can be seen, this particular arrangement allows the box cover member and the base ring member to be angularly joined in any of eight selected locations. This greatly facilitates the use of the structure and allows connection of the conduit to the cover prior to its installation on the base ring member without requiring strict adherence to connection at any one location on the cover member.

Referring again to the flexible legs 62, it will be seen that they terminate in radially extending catch members 64 which are located at a distance from the flange 56 such that when they are positioned in the openings 30 as shown in FIG. 3, they latch under the radial outer element 32 and a proper sealed connection is achieved between the upper seal edge 44 of the ring body 16 and the undersurface of flange 56. The arrangement of the two elements 32 is such as to serve both as a guide for entry of the leg 62 into position and also to act to direct the leg into its latched position and to tend to resiliently hold it in the full latched position.

Figure 10:
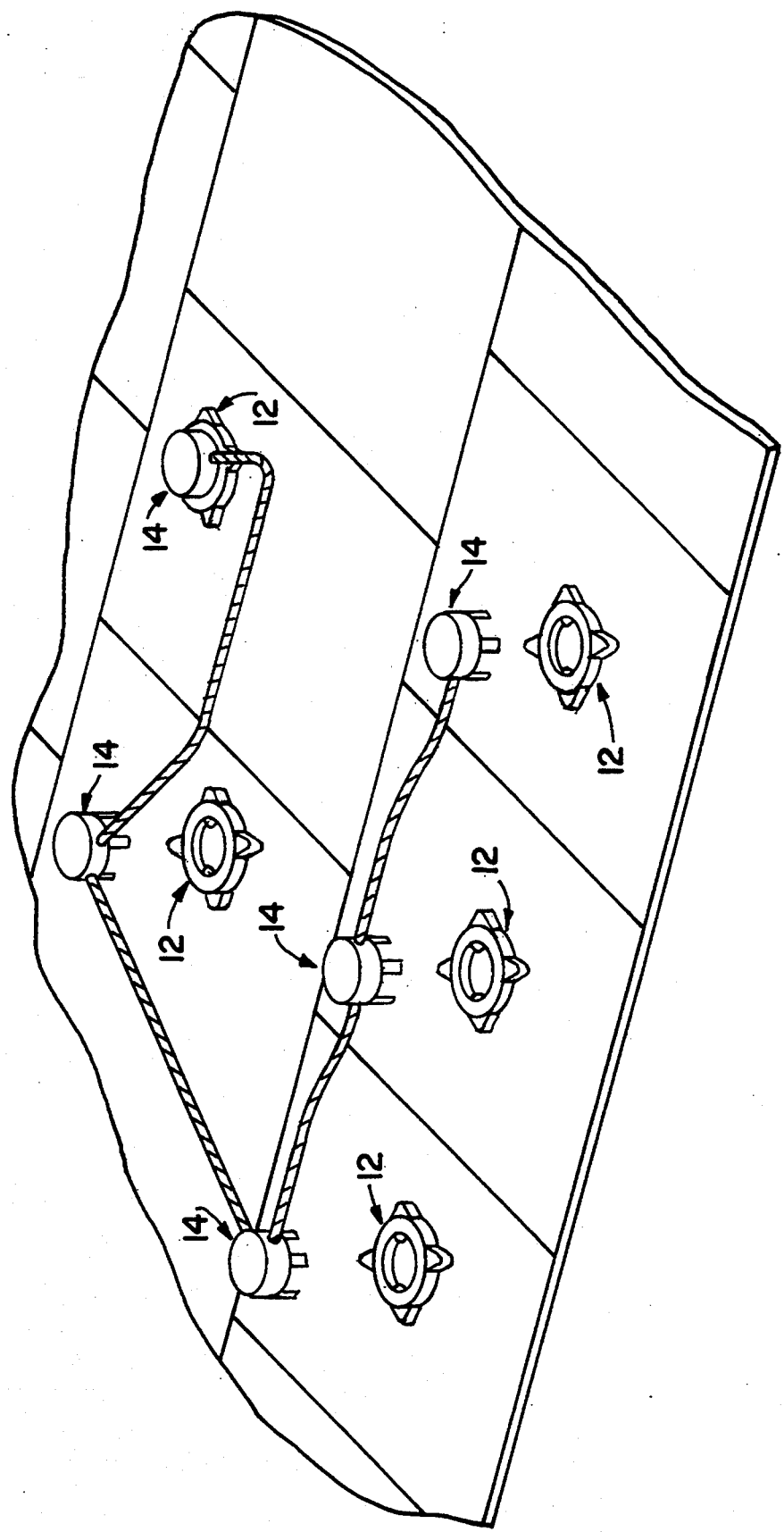
FIG. 10 is a pictorial view showing a typical installation using the box assemblies of the subject invention.

FIG. 10 is a partial isometric view showing how the box assembly of FIGS. 1–9 is used in the construction of a poured concrete building partition, for example a ceiling. After placement of the forms over which the concrete will be poured, the desired locations for electrical boxes are identified. At each location so identified, a base ring member 12 is positioned and attached directly to the form by nails or screws passing through openings 22. In locating the base rings 12, due consideration is given to the desired final location for the tabs 34 and 36.

After the base rings 12 are in position, a corresponding number of box cover members 14 are interconnected in the desired manner with the necessary pattern of flexible non-metallic conduit. After the conduit is connected to the box cover members 14, they are located in position on the proper base ring and joined thereto. This completes the preparations of the conduit and outlet box system and pouring of the concrete can take place.

After the concrete is cured and the forms are removed, access is had to the interior of the boxes for pulling the necessary wiring and installation of the lighting fixtures or other components. As can be appreciated, the base ring, as well as the box cover, remain in place in the concrete since concrete is under and around the flange 28.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. An electrical box assembly for installation in a poured concrete building partition comprising:
   a base ring member formed of plastics material and including a continuous ring body having a central through opening and radially extending mounting tabs for permitting the base ring member to be joined to a form over which concrete is to be poured during forming of the building partition, the base ring member further including an upper edge surrounding the through opening with connection portions lying radially outwardly of the upper edge;
   a box cover member formed of plastics material having a circumferentially continuous side wall, a closed top wall, and an open bottom, the side wall terminating in a lower edge with a laterally extending shoulder receiving the upper edge of the base ring member;
   the box cover member further including releasable connecting means joined with the connecting portions on the base ring member for maintaining the flange on the box cover member in engagement with the upper edge of the base ring member; and, selectively removable knockout portions in the side wall for allowing connection of conduit therewith.

2. An electrical box assembly as defined in claim 1 wherein the base ring member includes a radial flange extending outwardly about the upper edge and carrying the connecting portions.

3. An electrical box assembly as defined in claim 1 wherein the base ring member includes inwardly extending tab portions for permitting mounting of electrical components in the box assembly.

4. An electrical box assembly as defined in claim 1 wherein the connecting means on the box cover member comprise resilient legs extending downwardly and having latch portions engaged with the connecting portions of the base ring member.

5. An electrical box assembly as defined in claim 4 wherein the connecting portion on the base ring member include connecting openings through which the resilient legs extend.

6. An electrical box assembly as defined in claim 5 wherein the connecting openings are formed through the radial flange about the upper edge of the base ring member.

7. An electrical box assembly as defined in claim 5 wherein the box cover member has a plurality of the resilient legs and the base ring member has a plurality of the connecting openings, the circumferential spacing between the legs and the circumferential spacing between connecting openings being selected and arranged to permit joining of the box cover member to the base ring member in any of several selected positions.

8. An electrical box as defined in claim 1 wherein the base ring member is formed of a relatively rigid, fiber reinforced plastics material.

9. An electrical box as defined in claim 2 wherein the mounting tabs are integral with the radial flange.

10. An electrical box as defined in claim 9 wherein the radial flange is an integral part of the ring body.

11. An electrical box assembly as defined in claim 10 wherein the ring body includes means for permitting electrical components to be mounted therein.

12. An electrical box assembly as defined in claim 1 wherein the connecting portions on the base ring member and the releasable connecting means on the box cover member are positioned and arranged to allow the base ring member and the box cover member to be joined in any of a plurality of different selected angular orientations.

13. An electrical box assembly as defined in claim 12 wherein the connecting portions and the releasable connecting means include cooperating resilient legs carrying catch elements engageable with the connecting portions on the base ring member.

14. An electrical box assembly for installation in a poured concrete building partition comprising:

a base ring formed of plastics material and having a central through opening and mounting means for installing the ring to a form over which concrete is to be poured during forming of the building partition, the ring member including fastening means for supporting electrical components such as switches and outlets therein, a top seal edge carried by the base ring to encircle the central through opening;

a box cover formed of plastics material and having a continuous side wall, a closed top wall, and an open bottom with a seal shoulder sized to receive and mate with the top seal edge of the base ring; and, releasable connecting means for joining the box cover to the base ring in a preselected one of a plurality of positions wherein the seal edge is mated with the seal shoulder.

15. An electrical box assembly as defined in claim 14 wherein the releasable connecting means includes resiliently mounted catch elements on one of said base ring and said box cover.

16. An electrical box assembly as defined in claim 15 wherein the catch elements are carried on resilient legs extending from the box cover.

17. An electrical box assembly as defined in claim 16 wherein the resilient legs extend through openings in the base ring.

* * * * *